United States Patent
Piatt

(10) Patent No.: US 10,635,810 B2
(45) Date of Patent: Apr. 28, 2020

(54) PROBABILISTIC ANTI-ENCRYPTING MALWARE PROTECTIONS FOR CLOUD-BASED FILE SYSTEMS

(71) Applicant: Jungle Disk, L.L.C., San Antonio, TX (US)

(72) Inventor: Bret Piatt, San Antonio, TX (US)

(73) Assignee: JUNGLE DISK, L.L.C., San Antonio, TX (US)

( * ) Notice: Subject to any disclaimer, the term of this patent is extended or adjusted under 35 U.S.C. 154(b) by 270 days.

(21) Appl. No.: 15/885,773

(22) Filed: Jan. 31, 2018

(65) Prior Publication Data

US 2019/0236272 A1    Aug. 1, 2019

(51) Int. Cl.
| | | |
|---|---|---|
| *G06F 21/55* | (2013.01) | |
| *G06F 21/56* | (2013.01) | |
| *H04L 29/06* | (2006.01) | |

(52) U.S. Cl.
CPC ......... *G06F 21/554* (2013.01); *G06F 21/566* (2013.01); *H04L 63/0281* (2013.01); *H04L 63/145* (2013.01); *G06F 2221/034* (2013.01)

(58) Field of Classification Search
CPC ............... G06F 21/554; G06F 21/566; G06F 2221/034; H04L 63/0281; H04L 63/145
See application file for complete search history.

(56) References Cited

U.S. PATENT DOCUMENTS

| | | | |
|---|---|---|---|
| 9,191,365 B2* | 11/2015 | Orr ..................... | H04L 63/0209 |
| 9,336,385 B1* | 5/2016 | Spencer .............. | H04L 63/1441 |
| 2017/0366395 A1* | 12/2017 | Goldfarb ............. | H04L 12/4633 |

* cited by examiner

*Primary Examiner* — Brian F Shaw

(57) ABSTRACT

Disclosed are systems and associated methods for protecting systems against software intended to damage or disable computers and computer systems, commonly called "malware" especially encrypting malware. Both agent-based and agentless implementations allow the identification of malware and the protection of local and cloud-based data by observing changes to filesystem structure and the information content of files, with no need to scan memory or interfere with the processing of individual processes. The data permeability of the protected system can be dynamically changed, allowing user-directed changes to be committed to storage and backed up, while adverse or potentially adverse changes are quarantined.

20 Claims, 7 Drawing Sheets

| Path (410) | Name (420) | Extension/Type (430) | Modification Time (440) | Entropy (450) |
|---|---|---|---|---|
| C:\User\Bob\report.pdf | report | .pdf | 1512777420.0194385 | 0.304 |
| C:\User\Bob\Music\today.mp3 | today | mp3 | 1512233344.2899188 | 0.781 |
| C:\User\Bob\notes.txt | notes | .txt | 1501143421.1226807 | 0.030 |
| C:\User\Bob\Projects\pm.zip | pm | .zip | 1520209274.9755019 | 0.584 |
| C:\User\Bob\Documents\report.docx | report | .docx | 1512777101.7432401 | 0.491 |
| C:\User\Bob\drawing.xcf | drawing | .xcf | 1490814342.1819412 | 0.220 |

PROBABILISTIC ANTI-ENCRYPTING MALWARE PROTECTIONS FOR CLOUD-BASED FILE SYSTEMS

BACKGROUND OF THE INVENTION a. Field of the Invention

The present disclosure generally relates to automatic defenses against software intended to damage or disable computers and computer systems, commonly called "malware." More specifically, the present disclosure relates to systems and methods for identifying malware, particularly encrypting malware, and automatically responding to protect the integrity of attacked data and client systems.

b. Background Art

The state of the art in detecting that a particular target program is malware and stopping it are based upon either 1) the identity of the target program, or 2) the actions of the target program. Identity-based systems use techniques such as matching the target program or its support files against a list of suspicious names (or name patterns), or using binary "signatures" corresponding to known malware programs or routines to see whether similar routines are included in the target program. Signature matching can be effective against known malware programs, but it is difficult to detect new types of malware that have unique signatures. In addition, the current state of the art in malware creation randomizes the binary code in the malware program, evading simple signature detection, and can also be programmed to avoid being written to disk, making it necessary to perform costly active scanning of the running computer's memory.

Action-based systems use lists of various "risky" behaviors or properties to evaluate whether the target program is acting in a way that is more likely to be harmful. Certain operations, such as accessing the memory of other programs, certain system calls, etc. are more frequently associated with malware. A target program that engages in a sufficient number of "risky" or suspicious calls is identified as malware. However, action-based systems can suffer from a large number of false positives for certain types of legitimate programs, such as debuggers. In addition, it is hard to catch "malware-free" malware that acts by controlling system-level administrative facilities because legitimate system facilities are typically excluded by default.

A third strain of anti-malware seeks to maximize system integrity. These anti-malware tools, such as the program "Tripwire," look at sensitive system files and alert the administrator when those sensitive files are changed. The presumption is that an absence of change is evidence of an absence of malware. While these programs are useful for helping maintain system integrity, however, they are less effective against user-targeting malware. User data changes far more frequently than sensitive system files, making a system bent on enforcing a lack of change ineffective for many purposes.

One notable area where many existing systems fail is in the case of encrypting malware. Encrypting malware replaces existing files with encrypted versions of the data, and usually includes some way to demand a "ransom" in exchange for the decryption key. These sorts of encrypting malware programs can evade signature-based checkers by encrypting or scrambling their own code, and their actions in accessing ordinary user data are typically outside the scope of what is considered "dangerous" by an action-based or file-integrity-based system.

The most recent advances in both identity and action-based systems use various machine learning and statistical techniques to determine whether the target program should be classified as malware. Different techniques can be used for different parts of the protected system, and a "defense in depth" approach can capture a number of different types of malware.

It is apparent, however, that current trends toward cloud-oriented computing and storage are likely to make the current state of the art systems much less effective. Cloud computing is likely to split processing between one or more client computers and one or more server computers, and the type of direct observation of potential malware and "protected" files will become inefficient if not impossible. Thus, a new and more distributed manner of protecting client computers against malware is needed.

BRIEF SUMMARY OF THE INVENTION

In various embodiments, a protecting system provides detectability and recoverability for a malware attack, especially an encrypting malware attack, for one or more protected systems. In various embodiments, the system solves various problems with prior art systems. For example:

In one embodiment, an anti-malware system examines changes in user data to identify that malware is at work, and then creates a shadow file system that preserves system integrity while still "allowing" the changes to occur.

In one embodiment, the data permeability of various parts of the client and server system can be instantly changed, isolating or freezing out potential destructive changes while still preserving the possibility of moving forward if it is determined that the changes are user-directed.

In one embodiment, the action of malware is identified without having to identify a particular malware program causing the attack.

In one embodiment, malware action is identified and blocked without an explicit agent acting on the protected system and without the scanning of memory or the trapping of system calls to identify suspicious behavior by processes.

In one embodiment, the action of malware on non-local files is identified and blocked.

DETAILED DESCRIPTION OF THE INVENTION

Figure 1:
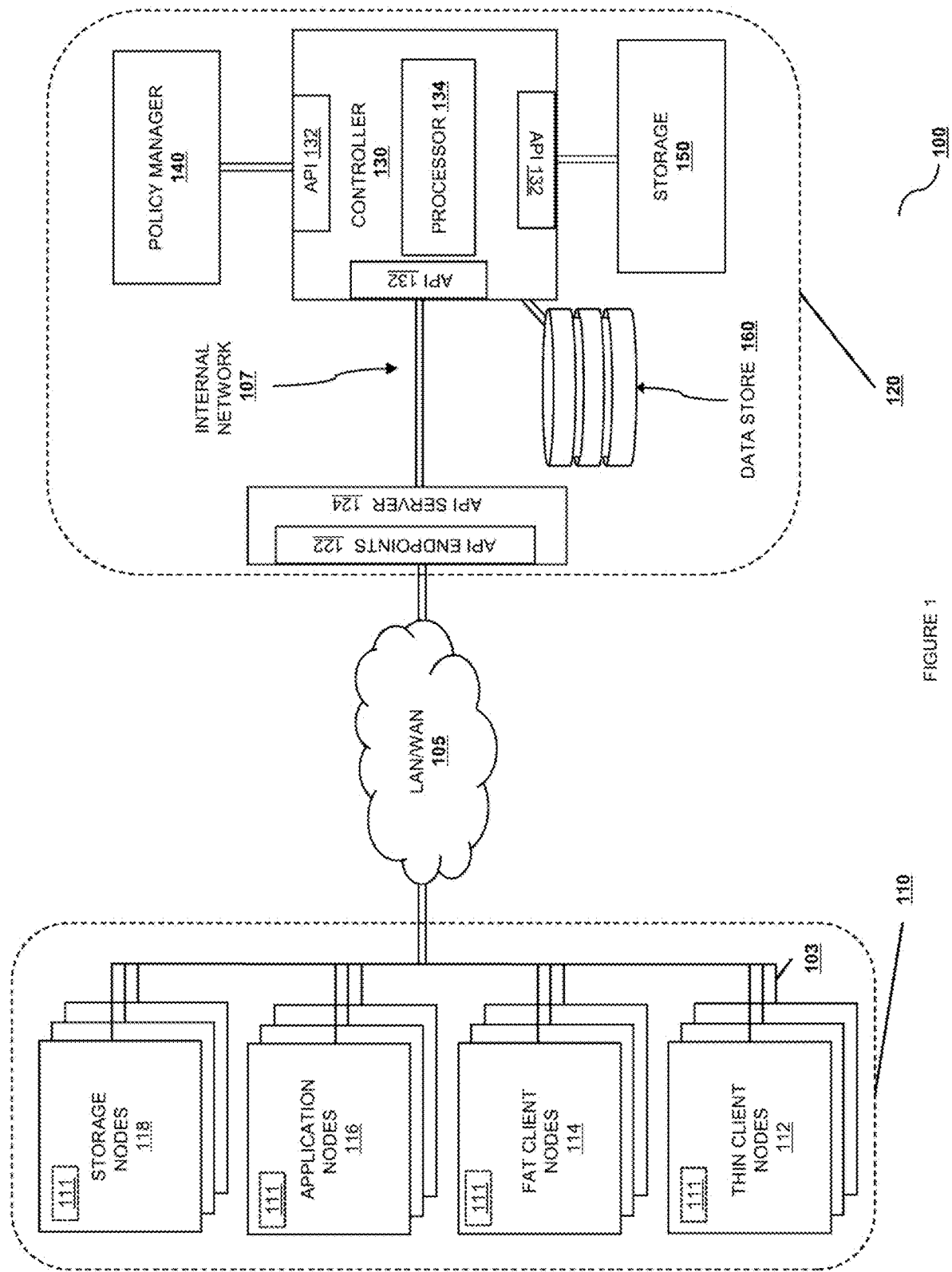
FIG. 1 is a schematic view illustrating a cloud backup and protection system according to various embodiments.

In the following description, various embodiments of the claimed subject matter are described with reference to the drawings. In the following description, numerous specific details are set forth in order to provide a thorough understanding of the underlying innovations. Nevertheless, the claimed subject matter may be practiced without various specific details. In other instances, well-known structures and devices are shown in block diagram form in order to facilitate describing the subject innovation. Various reference numbers are used to highlight particular elements of the system, but those elements are included for context, reference or explanatory purposes except when included in the claim.

As utilized herein, terms "component," "system," "datastore," "cloud," "client," "server," "node," and the like refer to portions of the system as implemented in one or more embodiments, either through hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The existence of various undiscussed subelements and subcomponents should be interpreted broadly, encompassing the range of systems known in the art. For example, a "client" may be discussed in terms of a computer having the identified functions and subcomponents (such as a keyboard or display), but known alternatives (such as a touchscreen) should be understood to be contemplated unless expressly disclaimed.

More generally, descriptions of "exemplary" embodiments should not necessarily to be construed as preferred or advantageous over other aspects or designs. Rather, use of the word exemplary is intended to disclose concepts in a concrete fashion.

Further, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

FIG. 1 shows a cloud backup and protection system 100 usable by various embodiments. The cloud backup system 100 primarily consists of two grouped systems: the protected systems 110 and the protecting system 120, each connected to each other via LAN/WAN 105. In many embodiments, the protected systems 110 will correspond to the systems controlled by a client or customer, and the protecting system corresponds to the systems controlled by a computer protection services provider. Although these two systems are each drawn inside of a particular "box" that shows their logical grouping, there is no implied physical grouping. The protected systems may be in one or more physical locations, the protecting systems may be in one or more physical locations, and the protecting and protected systems may be co-located or not. There are network connections 103 shown connecting the protected systems with each other, both those connections are exemplary only; the only necessary connection is to the protecting system 120 via LAN/WAN 105.

The protected systems includes a variety of information processing systems grouped into "thin client" nodes 112, "fat client" nodes 114, "application" nodes 116, and "storage" nodes 118. Each of the information processing systems 112, 114, 116, and 118 is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The distinctions between the different types of nodes have to do with the manner in which they store, access, or create data. The thin client nodes 112 are designed primarily for creating, viewing, and managing data that will ultimately have its canonical representation maintained in some other system. Thin client nodes 112 may have a local storage, but the primary data storage is located in another system, either located within the protected organization (such as on a storage node 118) or in another organization, such as within the protecting organization 120 or within some third organization not shown in the diagram. Fat client nodes 114 have a local storage that is used to store canonical representations of data. An application node 116 hosts one or more programs or data ingestion points so that it participates in the creation of new data, and a storage node 118 includes storage services that are provided to other nodes for use. Either an application node 116 or a storage node 118 may or may not be the location of a canonical representation of a particular piece of data. Note that the categories of nodes discussed above ("fat client," "thin client," "application," and "storage") are not exclusive, and that a particular node may be a fat client in certain circumstances or with reference to certain data, a thin client in other circumstances and for other data, and likewise an application or storage node in certain circumstances or for certain data. These different roles may take place serially in time or contemporaneously. Certain embodiments may also benefit from optional agents 111, which may be associated with any type of node and which are command processors for the protection system 120. In addition, the term "node" is not necessarily limited to physical machines only, and may include containers or virtual machines running on a common set of underlying hardware by means of a hypervisor or container management system, where the hypervisor can itself be a "node" and the managed virtual machines or containers are also optionally "nodes."

The protecting system 120 has a number of associated subcomponents. At the network ingestion point there is an API endpoint 122 with a corresponding API server 124. Although this has been drawn in the singular, there may be more than one API endpoint 122 on each API server 124, and there may be more than one API server 124. These API servers 124 may be combined to provide additional robustness, availability, data isolation, customer isolation, or for other business or technical reasons. The API server 124 may perform appropriate error checking, authorization, or transformation on any information or call that comes in via API endpoint 122 prior to passing the call or data to controller 130. Controller 130 is the primary processor for the protecting system. Controller 130 is implemented either as an information processing system, a process, subprocess, container, virtual machine, integrated circuit, or any combination of the above. In various embodiments, controller 130 interacts with other components via internal APIs 132, and it may include a dedicated processor or subprocessor 134. The controller 130 implements the "protecting" code and monitors the state of the protected systems, taking action when necessary. The processes and methods described herein are implemented by or on controller 130, in conjunction with other special-purpose elements of the protecting system. In various embodiments these can include a policy manager 140, a storage 150, or a data store 160. The policy manager 140 is a processing element including specific-purpose code and/or hardware enabling it to efficiently model business or security policies in a logical form and evaluate compliance with those policies on an ongoing basis. The storage 150 can be an internal component, single system, or multiple systems providing a method for safely storing and retrieving arbitrary bit sequences. These bit sequences can be internally represented as objects, as a bit/byte array, or as a log-structured or tree-structured filesystem. Various storages may support multiple access methods to facilitate ease of use. The data store 160 is a structured data storage, such that arbitrary data can be stored, but there are restrictions on the form or the content of the data to allow superior searchability, relationality, or programmability. In various embodiments, the data store 160 can be a SQL or NoSQL database.

Figure 2A:
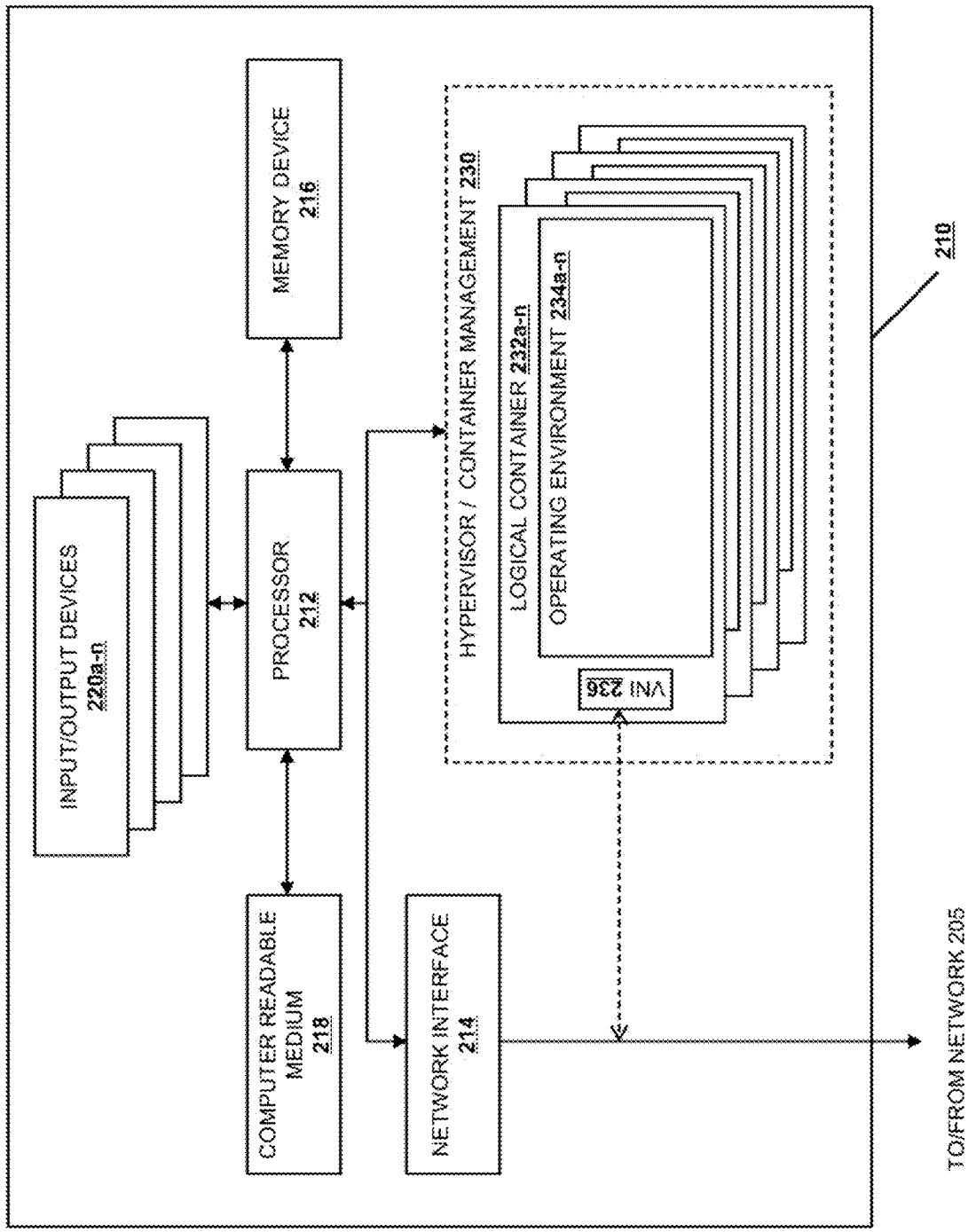
FIG. 2a is a schematic view illustrating an information processing system as used in various embodiments.

FIG. 2a shows the details of an information processing system 210 that is representative of, one of, or a portion of, any information processing system as described above. The information processing system 210 may include any or all of the following: (a) a processor 212 for executing and otherwise processing instructions, (b) one or more network interfaces 214 (e.g., circuitry, antenna systems, or similar) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below. In one or more embodiments, the information processing system 210 may also include a hypervisor or container management system 230, the hypervisor/manager further including a number of logical containers 232a-n (either virtual machine or process-based), each with an associated operating environment 234a-n and virtual network interface VNI 236a-n.

Various embodiments of a probabilistic anti-malware protection system will be discussed in the context of a protected and protecting system as disclosed above. For purposes of this discussion, the particular problem of encrypting malware will be discussed, but the underlying protection process is applicable to other situations and types of malware as will be discussed herein.

In one embodiment, the protecting system uses an agent (such as agent 111 discussed relative to FIG. 1) to observe and record changes, with those changes being recorded either locally or by the protecting system 120 in the storage 150 or the data store 160. In another embodiment, changes to files requested by the client node, especially those with canonical representations in locations other than the monitored node, are captured as network traffic either on network 103 or based on an agent or interface associated with the storage system holding the canonical representation. Generally, there are a number of methods of capturing and recording user data already known in the art, such as those associated with backup, monitoring, or versioning systems. These various capturing and recording systems for automatically capturing user data and changes made to user data can be included as an equivalent to the agent 111 and capturing functionality associated with the protecting system.

Figure 2C:
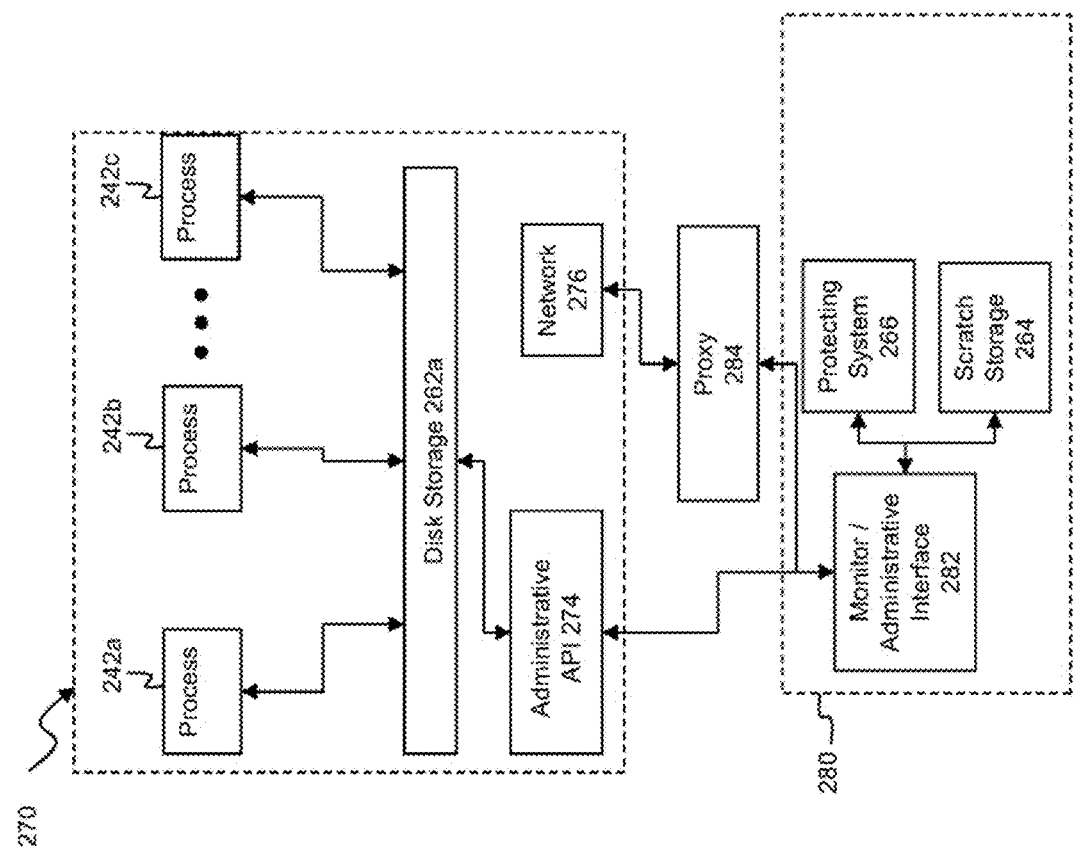
FIG. 2c is a schematic view illustrating an agentless subsystem for monitoring and protecting an information processing system as used in various embodiments.
Figure 2B:
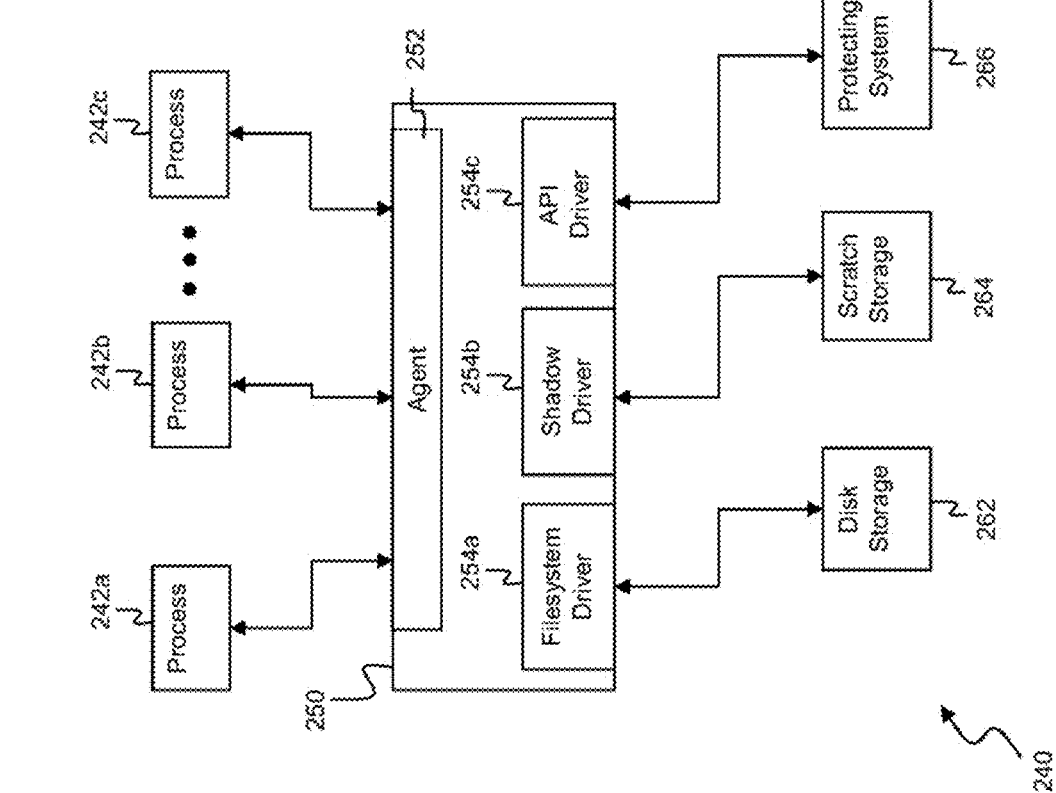
FIG. 2b is a schematic view illustrating an agent subsystem for monitoring and protecting an information processing system as used in various embodiments.

FIGS. 2b and 2c show two embodiments the interface between the protecting system and a protecting system. FIG. 2b is an implementation of an agent system (as with agent 111) used in various embodiments and FIG. 2c is an implementation of an agentless system as used in various embodiments.

Turning to FIG. 2b, the agent subsystem is shown at reference 240. In an embodiment that uses an agent present on the information processing system, the agent 252 is interposed as a filter or driver into the filesystem driver stack 250. In one embodiment, this is a kernel extension interposed between the kernel and filesystem interface. In another embodiment, it is a filesystem driver that actually "back-ends" to existing filesystem drivers. In a third embodiment, there is no kernel or filesystem driver, but the agent is a user-space process that listens to kernel I/O events through an API such as the inotify API. Another embodiment may simply be a process that "sweeps" the disk for new changes on a regular basis. Each of these embodiments has advantages and drawbacks. Implementations that interface with the kernel are more likely to be resistant to change by malware, but may also have higher overhead. Embodiments in user space may be easier to deploy.

Assuming an embodiment that uses a filter driver, all file-oriented API requests being made by various processes 242a-c are intercepted by the agent filter 252. Each process reading and writing is viewable by the agent, and a "reputation" score can be maintained for each process on the basis of its effects on the user's data. For each API request, the ordinary course of action would be to send it to one or more backend drivers simultaneously. A trusted change can be sent directly through the filesystem driver 254a to the disk storage 262. Changes that have some probability of user data damage are sent through shadow driver 254b to scratch storage 264, which provides a temporary holding location for changes to the underlying system. Changes in the scratch storage can be either committed by sending them to the disk storage 262, or they can be sent to the protecting system at 266, or both. This allows the permeability of changes to be modified on a per-file, dynamically changing basis. It also allows changes to user data to be segregated by process, which can assist in the identification and isolation of malware, even though the malware process itself is not being sampled or trapped. It also allows the protecting system to keep a log of the changes to the file on a near-real-time basis, and keep either all changes or those deemed significant.

In an implementation that does not intercept all file-oriented API requests being made by the processes 242a-c, the agent process instead follows closely behind each change. In one embodiment, this is done by sampling from lsof ("list open files") or a similar utility and listening for filesystem change events. Processes can be associated with changes to individual files through the combination of information provided and each change can then be sent to the protecting system as in the previously discussed filesystem filter driver embodiment. Scratch files can be kept in a separate location either on or off the protected system. Although the data permeability on the client system may be higher, the permeability of harmful data changes into the storage areas managed by the protecting system can still be kept low.

FIG. 2c shows one implementation of an "agentless" system. A node of the protected system is identified at reference 270. Because there is no resident agent on the system, local filesystem changes by processes 242a-c are committed directly to the local disk storage 262.

Because the protecting system does not have an agent resident on the protected node 270, there are a collection of remote monitor processes, shown generally as the dotted box at reference 280. In this embodiment, there are two primary methods of interacting with the system. The first is the administrative API 274, which is built in to the operating environment on protected node 270. This administrative API allows the starting and stopping of processes, the copying of files within the system and over the network connection 276, and other administrative actions. The monitor/administrative interface 282 interacts remotely with the administrative API to read file changes and make copies of files to the scratch storage 264 or to send information to the protecting system 266 to implement the protections as described further herein. The second primary method of interacting with the protected node 270 is by monitoring external network traffic via proxy 284. Interactions with file storages and APIs are intercepted and provided to the monitor 282. In this case, the proxy acts similarly to the filesystem filter driver as described relative to FIG. 2b, but for remotely stored user data.

An alternative agentless implementation uses network tap 285 instead of proxy 284. A network tap is a system that monitors events on a local network and in order to analyzing the network or the communication patterns between entities on the network. In one embodiment, the tap itself is a dedicated hardware device, which provides a way to access the data flowing across a computer network. The network tap typically has at least three ports: an A port, a B port, and a monitor port. A tap inserted between A and B passes all traffic through unimpeded in real time, but also copies that same data to its monitor port, enabling a third party to listen. Network taps are commonly used for network intrusion detection systems, VoIP recording, network probes, RMON probes, packet sniffers, and other monitoring and collection devices and software that require access to a network segment. Use of the tap for these same purposes can be used to provide enhanced security for the protected system 270. Taps are used in security applications because they are non-obtrusive, are not detectable on the network (having no physical or logical address), can deal with full-duplex and non-shared networks, and will usually pass through or bypass traffic even if the tap stops working or loses power. In a second embodiment, the tap may be implemented as a virtual interface associated with the operating system on either the protected or protecting systems. The virtual interface copies packets to both the intended receiver as well as to the listener (tap) interface.

Many implementations can use a mixture of agented and agentless monitors, or both systems can be used simultaneously. For example, an agented system may use a proxy 284 to detect changes to remotely stored user data, while still using a filter driver to intercept and manage locally stored data changes. The exact needs are dependent upon the embodiment and the needs of the protected system. Certain types of protected nodes, such as thin client nodes 112, may be better managed via agentless approaches, whereas fat client nodes 114 or application nodes may be better protected via an agent. In one embodiment, storage nodes 118 may use an agent for the storage nodes' own files, whereas a proxy is used to intercept changes to user files that are being stored on the storage node 118 and monitored for protection.

One function of the protecting system 120 is the maintenance generally of "backups"—that is, time-ordered copies of the system files allowing recovery of both individual files and complete systems. The representation of these backups within the storage 150 is not essential to any embodiment, but various embodiments do leverage the client protected system's view of the storage. In most cases, the client's view of the system is as one or more filesystem trees.

Figure 3A:
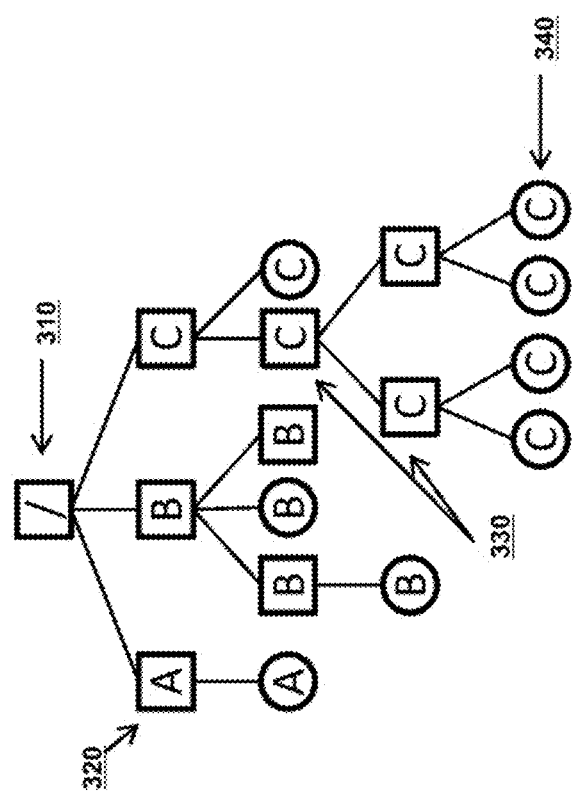
FIG. 3a is a representation of the client view of a filesystem tree as used in various embodiments.
Figure 3B:
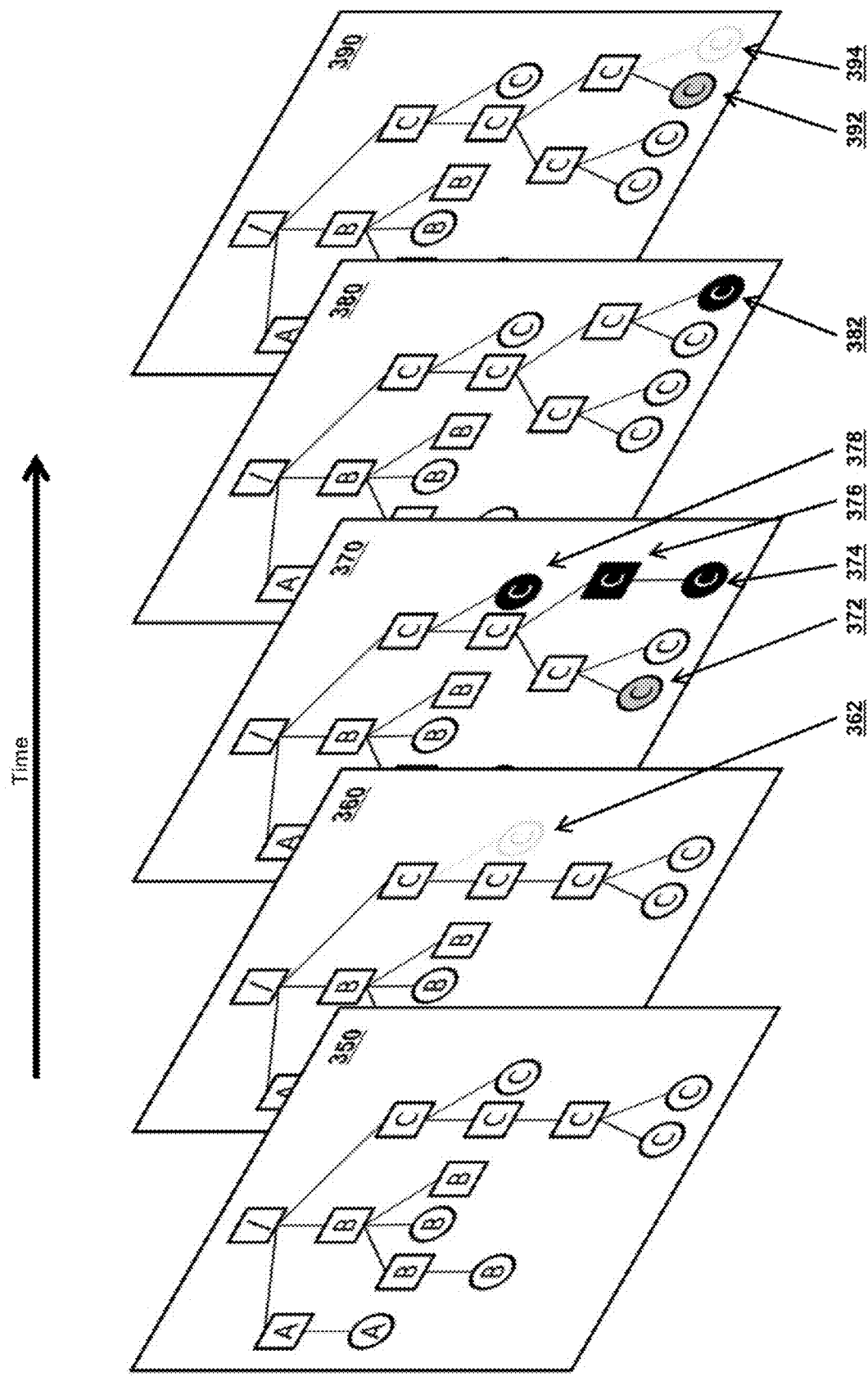
FIG. 3b illustrates the change in a filesystem of an information processing system over a series of discrete snapshots in time as used in various embodiments.

FIG. 3a shows a logical representation of a filesystem tree, with root 310, user directory 320, user subdirectories 330, and user files 340. FIG. 3b shows how the filesystem can change over time, with each representation 350, 360, 370, 380 and 390 showing a different consistent snapshot of the filesystem tree. From snapshot 350 to 360, the user file 362 is deleted. From snapshot 360 to 370, the user file 372 is changed in content, the user directory 376 is created as well as user file 374, and user file 378 is created in the same location as the previous user file 362. Snapshot 380 shows the creation of new user file 382, and snapshot 390 show the deletion of the new file at 394 and a change in the contents of the file at 392. The protecting system records the changes to the file system, including making whole-filesystem-tree snapshots or by making sequential ordered copies of individual files and just recording the tree locations as metadata. One typical use of this capability is for backups of user or system data, but, as described in the present disclosure, the protecting system 120 uses both the client logical view of the filesystem—the client data—as well as information regarding the patterns of change (such as the changes from snapshot to snapshot in FIG. 3b), and the change in the nature of client data (as shown at reference 372 in FIG. 3b) to intercept and prevent damage from malware.

One measure of the system is the allowed data permeability, that is, the ability for changes in the data to move through and be recorded and made permanent (high permeability) versus having all changes be temporary only (low permeability). The goal of the system is to have high permeability for requested and user-directed changes, and low permeability for malicious data changes. If changes to user data can be characterized relative to their utility, then high-utility changes can be committed and low-utility changes blocked, regardless of whether they are malicious or not. For example, the truncation of a file may be the result of user error rather than malware, but characterizing the change as having low utility suggests that the permeability to that change should be low. In various embodiments, this is implemented by keeping a number of different versions of the file in snapshots or "shadow" filesystems by the protecting system, corresponding to one of the filesystem snapshots as described relative to FIG. 3b. In another embodiment this is implemented using a log-oriented data structure, so that earlier versions of files and filesystems are maintained until a rewriting/vacuum procedure occurs. From the perspective of the user of the system, each change is committed and the state of the filesystem is as expected from the last few changes that have occurred. But from the perspective of the protecting system, each change is held and evaluated before it is committed, and different types of changes will be committed further and other changes will be transparently redirected to a temporary space that will have no effect on the long-term data repository. In addition, various embodiments also take file-based or system-based snapshots not only due to the passage of time (as in the prior art), but due to observed changes in the user data that may be indicative of malware action or user error.

More specifically, each type of malware has a distinctive effect on user data. The signature behavior of encrypting malware is its encryption of user data, as opposed to efforts to access and exfiltrate the data or control the underlying computer. There exist strains of both recoverable and unrecoverable encrypting malware. Recoverable encrypting malware is theoretically decryptable via a key held by the attacker. Unrecoverable encrypting malware disorders, truncates, or otherwise scrambles the data in a way that cannot be decrypted. Typical encrypting malware reads the original data, encrypts the data write encrypted data, and removes the original data to complete this transformation. This type of encrypting malware can be further classified various ways.

A first type of encrypting malware overwrites the contents of an original file by opening the file with read, write, and append permissions, reading its contents, the contents of the file, encrypting the contents, and then writing back the encrypted contents in place, typically not changing the size of the file. From the perspective of the protecting system, this looks like a change in contents of a file, as is show relative to reference 372. A second type of encrypting malware moves the file to a temporary directory, writes an encrypted version of the file, and then moves the encrypted version back into place. From the perspective of the protecting system, this can look like the change to the user file shown from snapshot 350, through 360 at reference 362 (file is removed) and then a new encrypted file is written in place (reference 378 in snapshot 370). A third type of encrypting malware will open up two I/O ports, one for reading the user file and one for writing the encrypted file, and then will perform a rename to place the encrypted file in the place of the original file. From the perspective of the protecting system, this can look like the changes in user files 374, to 382, to 392 and 394 in snapshots 370-390. The existing user file 374 is read and the encrypted output is created as new file 382 in snapshot 380, and then the encrypted file is renamed to replace the original file, which appears as a change in content at reference 392 and the removal of the file at reference 394 (both in snapshot 390).

Figures 4, 5:
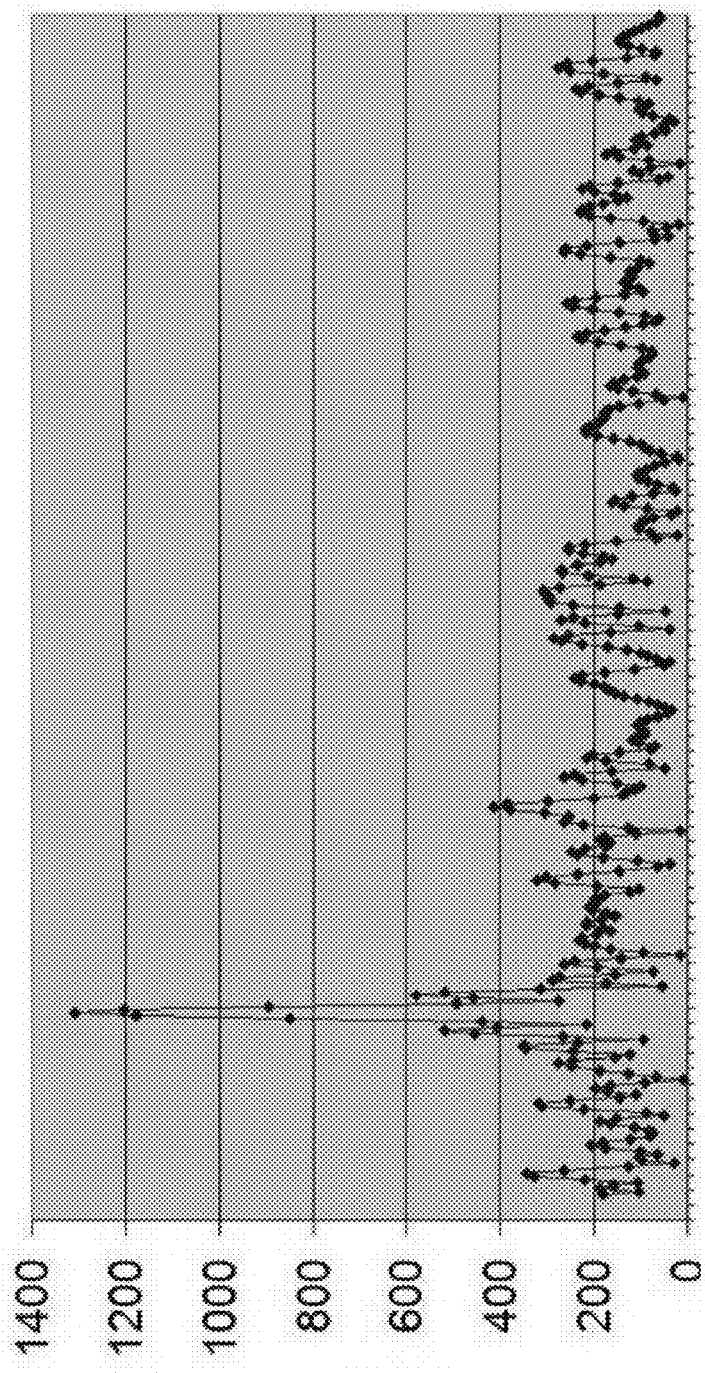
FIG. 4 shows a set of metadata recorded about the files in an information processing system according to one embodiment.
FIG. 5 shows a file access frequency graph as used in various embodiments.

FIG. 4 shows a different aspect of user data captured by the system—the metadata associated with a particular file. Included in the typical metadata tracked by protecting systems are the path to user files 410, the names of user files 420, the extension (or the associated file type) of a file 430, and creation and/or modification times 440. In one embodiment of the protecting system, the system also records the entropy of the associated file 450.

FIG. 5 shows another type of metadata recorded according to one embodiment—the access frequency of a file over time. The access frequency of the file can be measured from either an individual node perspective as well as from a protected organization perspective by summing all accesses from all clients.

In one embodiment, the protecting system records all the information above. This system uses the client-centered view of the data and the changes to that data to identify and protect against malware, accomplishing the design of protecting against malware in a more efficient manner than the prior art, with the additional benefit of being able to protect against changes in cloud systems that other existing systems cannot capture.

Figure 6:
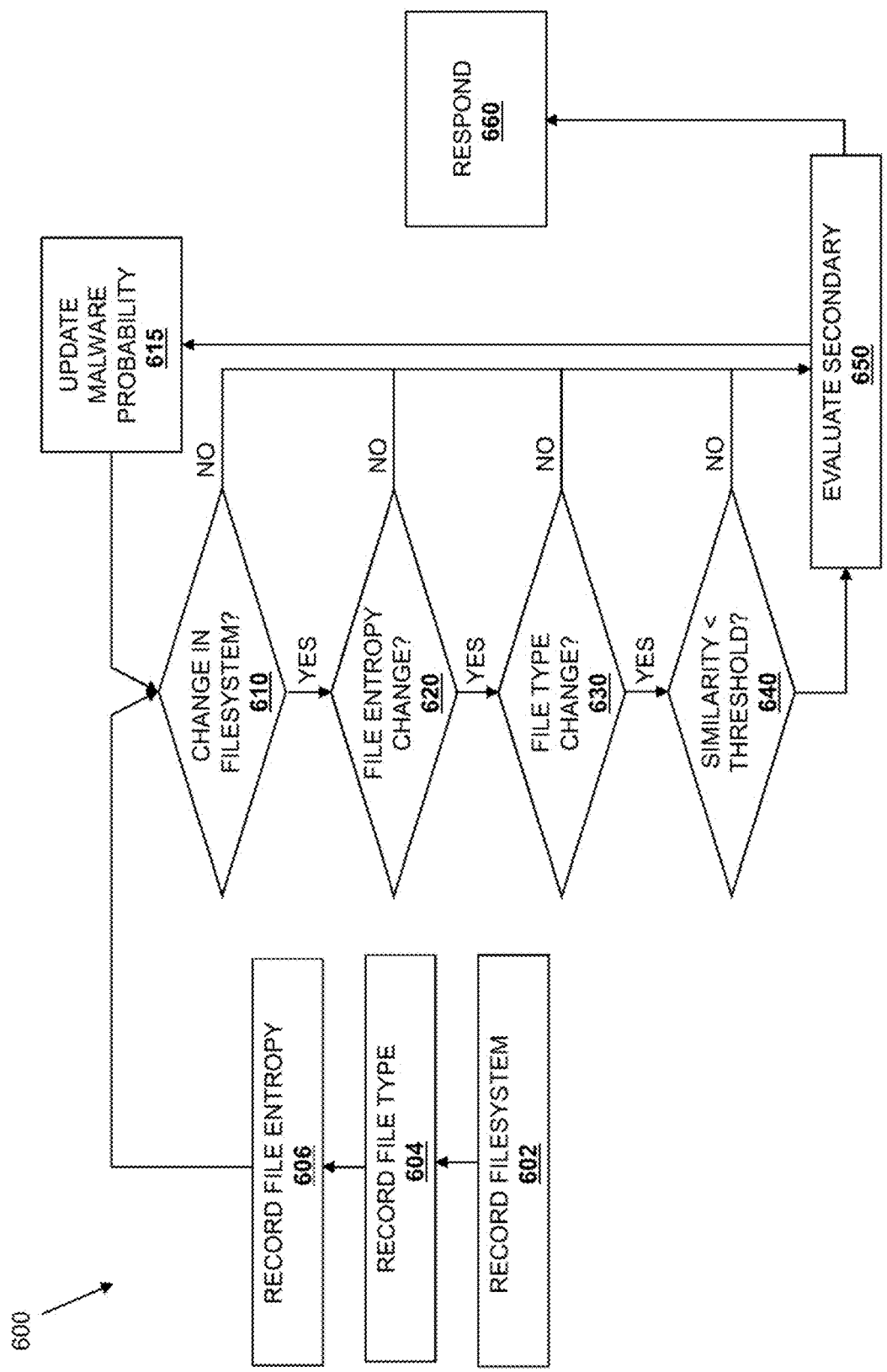
FIG. 6 shows a malware detection and response method as used in various embodiments.

One embodiment of a protection process is illustrated at reference 600 in FIG. 6, described relative to encrypting malware. The process starts with the preparing steps 602, 604, and 606 capturing of the initial state of the filesystem. Step 602 captures the structure of the filesystem as described relative to FIG. 3a. At step 604, the file type and associated file metadata (as described relative to FIG. 4) is recorded. At step 606, the structure of the user data, including the observed entropy of the file is recorded.

Processing then moves to the monitoring steps 610,620, 630, and 640. At step 610, some change in the filesystem is observed. This could be the creation of a file, the deletion of a file, the changing of the metadata of a file (such as a rename) or the changing of the content of a file (such as an update). The types of changes are described relative to FIG. 3b.

Given the change to a user file (as opposed to the creation or deletion of a directory only), processing then moves to the evaluation of the change. Steps 620 through 640 collectively evaluate the change in user data to identify the likelihood that a file is in a state that is the result of user action rather than malicious action.

At step 620 the entropy of the file is measured. The entropy associated with the file's values in sequence equal the negative logarithm of the probability mass function for the value. This can be considered in terms of either uncertainty (i.e., the probability of change from one bit/byte to the next) or in terms of possible information content. The amount of information conveyed by each change becomes a random variable whose expected value is the information entropy. Human-intelligible data tends to have lower entropy. Certain types of data, such as encrypted or compressed data, have been processed to increase their information content and are accordingly high in entropy. The entropy of a file can be defined as the discrete random variable X with possible values {0,1} and probability mass function P(X) as by a fair coin flip:

$$H(X)=E[I(X)]=E[-ln(P(X))]$$

As the ratio of entropy to order increases, the file has either more information or more disorder. In the context of encrypting malware, the goal of the malware is to scramble the contents of user files, making them more disordered and creating entropy. Therefore, an increase in entropy, especially a high increase in entropy, is more likely to be the result of encrypting malware, but by itself that is not enough to identify malware action. This is because other processes, such as compression, increase information content and thus entropy. In one embodiment, a substantial change in entropy between the old to the newly changed file—over 15%—is used to trigger a "yes" by the decision logic.

At step 630 the type of the file is evaluated. The type of data stored in a file can be approximated using "magic numbers." These signatures describe the order and position of specific byte values unique to a file type, not simply the header information. In one embodiment, the file type is determined by the magic number of the file, followed by the type signature, followed by the extension. By comparing the file type before and after the change in the file, possibly deleterious changes in the file can be identified. While not every change in a file type is malicious, a change in type—especially without an accompanying change in extension—tends to suggest the action of malware. In one embodiment, any change to the file type is enough to trigger a "yes" by the decision logic. In a second embodiment, changes in the file type but within the same "family"—i.e., a change from a .gif to a .png, or a change from application/vnd.ms-office.activeX+xml to application/vnd.openxmlformats-officedocument would be considered subcritical risks.

At step 640 the similarity of the changed file to the original file is evaluated. Even if information recompressed or versions of software change, there is an underlying similarity related to the user-directed content that tends to be preserved. For example, in one embodiment a locality-based hashing algorithm is used to process the old file and the new file and to place them into a similar vector space. Even with changes, the vectors will tend to be more aligned than would be explained by the null hypothesis. In another embodiment the contents of the two files are compressed with gzip (or a similar program), which tends to increase the information content of the information, resulting in higher similarity. However, as the goal of encryption is to disguise information, encrypting malware should produce content that is highly dissimilar to the original content and the resulting vectors or compressed representations should be about as dissimilar as a random vector would be from the original content. In one embodiment, a similarity difference of more than 20% is used to trigger a "yes."

In each case, the change is significant beyond a relatively minor threshold (even 10-20%) processing moves to the next step. If the threshold is not met, then processing returns to the top of the evaluation loop at 610. In one embodiment, the system also includes a malware probability counter 615 that aggregates sub-critical malware probabilities from each of the steps 610-640 and then exponentially decays the inferred probability from many subcritical probabilities. The current count from the malware probability counter is also provided to the decision points 610, 620, 630, and 640, incrementally increasing the chance that a particular change will hit above the threshold.

Whether or not the threshold has been reached for all three primary indicators, a number of secondary considerations can also be evaluated at step 650. In the case where the three primary indicators have triggered, it is highly likely that there is a malware attack going on and the secondary considerations can help mitigate the effects of the attack. If not all of the primary indicators are triggered, suspicious changes in user data can be used to update the probability counter 615. In various embodiments, these secondary considerations include:

Targeting of User Files Rather than System Files

For some types of malware, particularly encrypting malware, it is important to the attacker that the system still be functional, even while individual files are not readable. Extensive changes to user files to the exclusion of system files can indicate an attack by encrypting malware. In one embodiment, the system looks at the ownership metadata associated with the files that are changed and looks for per-user correlations, while excluding common administrator accounts.

Targeting of "Valuable" File Types

The system tracks the file type, extension, and name of each file. Many types of encrypting malware will only encrypt "valuable" file types as determined by extension. For example, TeslaCrypt and Alpha Crypt encrypting malware target files with the following extensions:

.3fr, .7z, .accdb, .ai, .apk, .arch00, .arw, .asset, .avi, .bar, .bay, .bc6, .bc7, .big, .bik, .bkf, .bkp, .blob, .bsa, .cas, .cdr, .cer, .cfr, .cr2, .crt, .crw, .css, .csv, .d3dbsp, .das, .dazip, .db0, .dba, .dbf, .dcr, .der, .desc, .dmp, .dng, .doc, .docm, .docx, .dwg, .dxg, .epk, .eps, .erf, .esm, .ff, .flv, .forge, .fos, .fpk, .fsh, .gdb, .gho, .hkdb, .hkx, .hplg, .hvpl, .ibank, .icxs, .indd, .itdb, .itl, .itm, .iwd, .iwi, .jpe, .jpeg, .jpg, .js, .kdb, .kdc, .kf, .layout, .lbf, .litemod, .lrf, .ltx, .lvl, .m2, .m3u, .m4a, .map, .mcmeta, .mdb, .mdbackup, .mddata, .mdf, .mef, .menu, .mlx, .mov, .mp4, .mpqge, .mrwref, .ncf, .nrw, .ntl, .odb, .odc, .odm, .odp, .ods, .odt, .orf, .p12, .p7b, .p7c, .pak, .pdd, .pdf, .pef, .pem, .pfx, .pkpass, .png, .ppt, .pptm, .pptx, .psd, .psk, .pst, .ptx, .py, .qdf, .qic, .r3d, .raf, .rar, .raw, .rb, .re4, .rgss3a, .rim, .rofl, .rtf, .rw2, .rwl, .sav, .sb, .sid, .sidd, .sidn, .sie, .sis, .slm, .snx, .sql, .sr2, .srf, .srw, .sum, .svg, .syncdb, .t12, .t13, .tax, .tor, .txt, .upk, .vcf, .vdf, .vfs0, .vpk, .vpp_pc, .vtf, .w3x, .wallet, .wb2, .wma, .wmo, .wmv, .wotreplay, .wpd, .wps, .x3f, .xf, .xlk, .xls, .xlsb, .xlsm, .xlsx, .xxx, .zip, .ztmp The CoinVault encrypting malware targets files with the following extensions:

.3fr, .accdb, .ai, .arw, .bay, .cdr, .cer, .cr2, .crt, .crw, .dbf, .dcr, .der, .dng, .doc, .docm, .docx, .dwg, .dxf, .dxg, .eps, .erf, .exif, .gif, .bmp, .indd, .jfif, .jpeg, .jpg, .kdc, .mdb, .mdf, .mef, .mp3, .mrw, .nef, .nrw, .odb, .odc, .odm, .odp, .ods, .odt, .orf, .p12, .p7b, .p7c, .pdd, .pdf, .pef, .pem, .pfx, .png, .ppt, .pptm, .pptx, .psd, .pst, .ptx, .r3d, .raf, .raw, .rtf, .rw2, .rwl, .sr2, .srf, .srw, .txt, .wb2, .wpd, .wps, .x3f, .xlk, .xls, .xlsb, .xlsm, .xlsx Other types of encrypting malware have similar lists. In one embodiment, the system identifies whether there are a higher than expected number of triggering changes associated with files that match probable "valuable" files and uses the percentage of valuable files as an additional trigger.

High Numbers of Deletions

Although deleting files is common, an abnormally high level of deletions is a valuable secondary indicator of encrypting malware. Referring again to encrypting malware that writes an encrypted file and then renames it to put in in place of the original file, a high number of paired create/delete actions could increase the probability counter.

Ordered Action

Encrypting malware typically does not encrypt randomly; instead it proceeds according to a set order. Changes to files that: 1) begin at a leaf node of the directory tree and proceed upwards; 2) target files in order of size across multiple directories (either smallest to largest or largest to smallest); or 3) target types of valuable files sequentially or alphabetically (all .doc, then all .docx, then all .drf, etc) also increase the probability that a malware attack is occurring.

Wide File Type Handling

Ordinary programs will have a smaller number of file associations, and many of those file associations will be open for inspection via various types of registries. Even if a program is not registered as being the primary handler for a particular file type, most programs will have a relatively small number of files that they use for input and output. In contrast, encrypting malware will read a very high number of disparate file types and will write a very small number of file types (as identified by magic number).

In one embodiment, there is an initial probability of an attack, usually between 10-20%, which is imputed on any change, and the probability is increased for each successful primary and secondary indicator. A multiplicative factor from 1.1 to 1.7 for each major factor and 1.05 for each instance of a secondary indicator are used as "rough and ready" threat indicators, and some probability threshold over 50% (usually in the range of 60-80%) is considered sufficient to move to step 660, respond.

The final step is respond, 660. There are four basic responses that can be undertaken, individually or collectively. The first response is to send a message, usually a notification. This message can be sent to the user associated with a process, to a system administrator, or to the administrator of the protecting system. The message can also be sent to a logging system. The identified user data changes, evidence (as associated with the primary and secondary indicators) and other proposed responses (as detailed below) are all available as elements of the message.

The second response is to halt processing. Halting processing is either on a per-process or system-wide basis. A per-process halt administratively kills the process and all subsidiary processes in the process tree. A system-wide halt shuts down the entire system.

The third basic response is to isolate the process or the changes. By redirecting all changes associated with an isolated, probable malware process to a "shadow" filesystem in a scratch area, the process does not necessarily see that its changes are not being committed because the system falsely reports a consistent state based upon the malware's actions. However, the actual data permeability has been set very low and no actual changes to user data are committed. This allows the studying of the process in a "honeypot"-type fashion, and the rolling forward of the changes if it turns out that they were actually the result of user choice.

A fourth basic response is to create an ongoing series of snapshots in the storage area of the protecting system, so that each instantaneous change is isolated into a transaction and each change can be rolled forward or rolled back, and the collective state at any point can be restored to the protected system.

Those of skill in the art will note that protection of the system occurs primarily via the characterization of changes to user data, rather than according to the actions of a particular process. While some embodiments will allow a particular process or program to be identified, there is no need to identify a particular malware program causing the attack to successfully detect the attack, protect the system, and remediate the damage. Further, there is no requirement for ongoing scanning of memory or profiling of running processes to identify malware; the malware is identified as a result of its actions on user data alone.

Finally, the interception of changes to non-local storages allows the protection of cloud-based storage without a necessary agent on either the cloud storage system or the protected node, a capability unique to various embodiments of the systems described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for detecting and mitigating attacks by malware, the system comprising:
   a protected system, the protected system including a processor and a memory, an operating system executing on the processor, wherein the protected system is associated with a protected storage, the protected storage including a first plurality of files organized in a first file system, and wherein the operating system moderates access to the first plurality of files by system processes executing on the processor;
   a protecting system, the protecting system including a file system change monitor, a threat analysis module, a storage controller, and a backup storage including a durable storage area including least a second plurality of files mirroring the first plurality of files, and a temporary storage area;
   wherein the protecting system further includes processor-executable instructions that, when executed by a processor associated with the protecting system:
      receive notification of a file change event via the file system change monitor;
      characterize the file change event by the threat analysis module, the characterization including at least two or more of a group selected from file creation, file deletion, file rename, file move, file type change, file entropy change, and file content change;
      classify, by the threat analysis module, the characteristics of the file change event to determine a malware probability estimate, wherein the malware probability estimate measures the system confidence that the file change resulted from the execution of a malware process; and
      if the malware probability estimate exceeds a threshold, diverts, by the storage controller, the storage of the file change event to the temporary storage area;
   wherein the durable storage area is physically distinct from the protected storage.

2. The system of claim 1, wherein the durable storage area is physically remote from the protected storage.

3. The system of claim 1, wherein the first plurality of files comprises a subset of operating system files and a subset of user files, and wherein the the malware probability estimate is moved higher as a result of changes to user files than changes to operating system files.

4. The system of claim 1, further comprising agent instructions being executed by the processor on the protected system.

5. The system of claim 1, wherein the protected system further includes a network interface, the protected system being communicably coupled via the network interface to a network, and further comprising a network agent coupled to the network such that the network traffic to the durable storage is observable by the network agent, and wherein the components of the protecting system are remote from the protected system.

6. The system of claim 5, wherein the network agent is implemented using one of a proxy and a network tap.

7. The system of claim 1, wherein the protected system further comprises a local storage distinct from the protected storage.

8. The system of claim 7, wherein the protected storage is remote from the local storage.

9. A method to protect user data against non-user action using a protecting system, comprising:
   establishing a baseline probability of non-user action;
   establishing a first threshold value associated with a high probability of non-user action;
   capturing an initial state of user data using a protecting system, wherein a substantially identical copy of the user data is stored in a cloud system, the cloud system having a storage including long-term and long-term storage areas;
   detecting a first attempted change to the user data stored in the cloud system;
   evaluating the change to the user data prior to storing the first attempted change in the long-term storage area;
   based on the evaluation of the change to the user data, determining a probability that the first attempted change is the result of non-user action; and
   determining a response to the change based on the probability and the first threshold value, wherein the response includes a determination as to whether to store the data in the short-term storage area or the long-term storage area.

10. The method of claim 9, wherein detecting the first attempted change is implemented using one of a proxy and a network tap communicably coupled between the protected system and the storage in the cloud system.

11. The method of claim 9, wherein detecting the first attempted change of the user data comprises detecting at least one of: deletion of the user data, creation of a new user data, change to the associated file metadata of the user data, change to the entropy in the user data, and and change to content of the user data.

12. The method of claim 9, wherein capturing the initial state of the user data comprises:
   capturing a first structure of the user data;
   capturing a first file type of the user data; and
   determining a first entropy of the user data.

13. The method of claim 12, wherein determining the probability based on the first attempted change comprises:
   determining a second entropy of the user data after the first attempted change;
   determining a first difference based on the first entropy and the second entropy;
   determining whether the first difference is higher or lower than an entropy change threshold;
   in response to the difference being lower than the entropy change threshold:
     decreasing the probability; and
   in response to the difference being higher than the entropy change threshold:
     increasing the probability;
   determining a second file type of the user data after the first attempted change;
   determining whether the first file type and the second file type are the same;
   in response to the first file type and the second file type being the same:
     decreasing the probability; and
   in response to the first file type and the second file type being different:
     increasing the probability;
   determining a second structure of the user data after the first attempted change;
   determining a second difference based on the first structure and the second structure;
   determining whether the second difference is higher or lower than a difference threshold;
   in response to the difference being lower than the difference threshold:
     decreasing the probability; and
   in response to the difference being higher than the difference threshold:
     increasing the probability.

14. The method of claim 9, further comprising:
   establishing a second threshold associated with a possibility of non-user action, where the second threshold is higher than the baseline probability and lower than the first threshold.

15. The method of claim 14, further comprising applying an exponential decay function to the probability of non-user action, so that, after the probability of non-user action is increased, it will fall to the baseline probability level.

16. The method of claim 14, wherein a probability score higher than the second threshold but lower than the first threshold will result in the storage of the changed data in the short-term storage area, and
   wherein the movement of the probability score under the second threshold will result in the migration of the changed data from the short-term storage area to the long-term storage area.

17. The method of claim 9, further comprising a secondary evaluation evaluating factors other than a change in entropy, a change in file type, and a change in similarity, and modifying the probability based on the secondary evaluation.

18. A system for detecting and mitigating attacks by malware, the system comprising:
   a protected system, the protected system including a processor and a memory, an operating system executing on the processor, wherein the protected system is associated with a protected storage, the protected storage including a first plurality of files organized in a first file system, and wherein the operating system moderates access to the first plurality of files by system processes executing on the processor;
   a protecting system, the protecting system including a file system change monitor, a threat analysis module, a storage controller, and a backup storage including a durable storage area including least a second plurality of files mirroring the first plurality of files, and a temporary storage area;
   wherein all components of the protecting system are physically distinct from the components of the protected system; and
   wherein the protecting system includes a component communicably interposed between the protected system and the protected storage; and
   wherein the protecting system updates the second plurality of files in a manner consistent with the updates to the first plurality of files, without affecting the operation of the protected system.

19. The system or claim 18, wherein the component communicably interposed between the protecting and the protected system is implemented as one of a proxy or a network tap.

20. The system of claim 18 wherein the second plurality of files are stored in a cloud storage system.

* * * * *